United States Patent Office 3,276,989
Patented Oct. 4, 1966

3,276,989
CATION PERMSELECTIVE MEMBRANES AND PROCESS FOR THE PRODUCTION THEREOF
Akira Nishihara, 62 Kuritaya Kanagawa-ku, Yokohama, Japan, and Yoshio Oda, 1 of 1 Ohmiya-cho, Kawasaki, Japan
No Drawing. Filed July 24, 1961, Ser. No. 125,957
5 Claims. (Cl. 204—296)

This invention relates to cation permselective membranes and processes for the production thereof and more particularly, to cation permselective membranes which are permeable to univalent alkali metal ions and ammonium ions in contrast to polyvalent cations, and processes for the production thereof.

Many cation permselective membranes are known which consist of insoluble infusible synthetic organic solid matrices and dissociable sulfonic groups bonded chemically to the said matrices and which are shaped in the form of membranes. These cation permselective membranes, as heretofore known, have the property that they are selectively permeable to cations but substantially not to anions and have been widely used.

These hitherto known cation permselective membranes, however, are permeable to polyvalent cations such as calcium ions and magnesium ions at the same time that they are permeable to alkali metal ions. The inventors of the present invention have executed numerous experiments and laborious studies and found that all of these known cation permselective membranes have the property of being equally or more permeable to calcium and magnesium ions than to alkali metal ions and ammonium ions.

On the other hand, there are many cases in practice where it is necessary to concentrate or remove, by electrodialysis, a specific component in a solution containing various kinds of ions of different valence. For example, when it is desired to concentrate sea water, it happens that a large quantity of calcium and magnesium salts is contained in the concentrated sodium chloride solution obtained, if a known cation permselective membrane is used. In addition, during electrodialysis insoluble calcium and magnesium salts are deposited on the membrane and in the container of concentrated solution and the electric resistance of the membrane becomes so high that it is difficult to pass an electric current. Thus, a cation permselective membrane that is readily permeable to sodium ions but not permeable to calcium and magnesium ions, is desired.

An object of the present invention is to provide cation permselective membranes which are readily permeable to univalent alkali metal ions and ammonium ions but poorly permeable to polyvalent cations and thus satisfy the above-mentioned requirements.

A further object of the present invention is to provide the said cation permselective membranes with minimum electrical resistance.

Other objects, effects and advantages of the present invention will be apparent from the following description.

The invention relates to cation permselective membranes obtained by coating, with a particular resinous compound, the surface of a cation selectively permeable membrane, which is formed by impregnating a copolymer latex of a monovinyl aromatic hydrocarbon compound and a conjugated aliphatic polyene compound in a reinforcing material, drying and then forming a membrane of the said copolymer latex, and thereafter, treating the thus obtained membrane with concentrated sulfuric acid to sulfonate and simultaneously to convert the copolymer constituting the said membrane to an insoluble infusible three dimensional network structure and which has a length of at least 1 cm. in two dimensions, and the resinous compound used for coating is a precondensation product which is produced by co-condensing in an alkaline medium at least one of the compounds of the formula

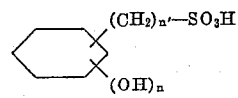

(wherein $n$ is the integer 1 or 2, and $n'$ 0 or 1) or their salts, phenol and formaldehyde, in a ratio of 1:3.5–10:4–35, and thereafter heating and curing the precondensation product in the membrane to form a film. Further, less than one-half of the above described phenol can be replaced by the corresponding moles of at least one of halogenophenol, nitrophenol, cresol, resorcinol and catechol.

It is disclosed in U.S. Patent No. 2,636,851 and others that cation permselective membranes may be produced by casting a precondensation product of phenol sulfonic acid and formaldehyde to the membrane form, heating and curing the resultant membrane. However, these membranes are rather more permeable to polyvalent cations than to univalent alkali metal ions and ammonium ions, and even if in the same way as in said patent this precondensation product is coated on the surface of a base membrane obtained by treating a membrane of copolymer latex of a monovinyl aromatic hydrocarbon compound and a conjugated aliphatic polyene compound with concentrated sulfuric acid, heated, and cured, the membrane thus obtained is still more permeable to polyvalent cations than to univalent alkali metal ions and ammonium ions.

In the hitherto known phenol sulfonic acid-type cation permselective membranes obtained by condensation of three components, that is, phenol sulfonic acid, phenol and formaldehyde, the quantity of phenol is ordinarily less than 1 mol per mol of phenol sulfonic acid.

In the present invention, on the contrary, the proportion of the compound with sulfonic groups shown by the said formula or its salt in the precondensation product which is to be coated on the base membrane is very small. Accordingly, as will be easily recognized, this condensation product is of extremely high electrical resistance. The membrane obtained from the said condensation product in the same way as in the said U.S. Patent No. 2,636,851 can not be used in practice as a cation permselective membrane, because the electric resistance of the membrane is very high.

The present inventors have now discovered that cation permselective membranes which have very low permeability to polyvalent cations and high permeability to univalent alkali metal ions and ammonium ions can be obtained when a very thin film of the said condensation product is formed on the surface of the said base membrane as set forth hereinafter.

Reference is made to the base membrane, the film to be formed thereon, and the process for the production thereof as follows:

Base membranes and process for their production.

In the present invention, the base membrane on which a thin film of a condensation product is to be formed has the following characteristics, that is, the base membrane is of the type of cation permselective membranes which have a length of at least 1 cm. in two dimensions, which consist of an insoluble infusible synthetic organic solid polymeric matrix and a dissociable sulfonic group chemically bonded thereto and which are electrolytically conductive. According to this invention, cation permselective membranes which are obtained by impregnating a copolymer latex of monovinyl aromatic hydrocarbon compounds and conjugated aliphatic polyene compounds in a reinforcing material such as glass fiber cloth, drying and thus forming a membrane of the said copolymer supported by the said reinforcing material, and thereafter, treating the thus produced membrane with concentrated sulfuric acid to introduce sulfonic group into the aromatic nucleus in the said copolymer and simultaneously to convert the said copolymer to an insoluble infusible three dimensional network structure, which have a length of at least 1 cm. in two dimensions and are composed of insoluble infusible synthetic organic solid polymeric matrices and dissociable sulfonic groups bonded chemically to the matrix, and which are electrolytically conductive and cation selectively permeable, are used as base membranes. Electrical resistance of the base membrane thus obtained is small, mechanical strength is large, and the transport number of cations through the membrane is excellent, and thus this membrane can effectively be used as a cation permselective membrane as is. However, like other hitherto known cation permselective membranes, this membrane has the property of being permeable to calcium and magnesium ions as well as to univalent alkali metal ions and ammonium ions.

As the said monovinyl aromatic hydrocarbon compound in this invention, styrene, o-, m-, or p-methyl styrene, α-methyl styrene, or vinyl naphthalene can be specified, and as the conjugated aliphatic polyene compound, butadiene-1,3, isoprene, 2,3-dimethyl butadiene-1,3 or chloroprene can be employed. The most typical ones among them are styrene in the former and butadiene-1,3 in the latter. The copolymer latex of styrene and butadiene-1,3 may be produced by a well known method, namely by emulsion-polymerizing both constituents in an aqueous medium in the presence of a suitable emulsifying agent, a polymerization catalyst, a pH-adjusting agent, a surface-tension-adjusting agent and the like at a low temperature, but it is convenient to utilize the desired copolymers readily available on the market in the form of latex, and in this invention, too, the commercially available products are preferably used. It is required that the copolymer latex used in the present invention be not yet substantially cross-linked, and the commercial products are satisfactory in this respect. In addition, it is preferable that the copolymer latices used in this invention contain the copolymer which consists of 20 to 75% of monovinyl aromatic hydrocarbon compounds and conjugated aliphatic polyene compounds and which is not yet substantially cross-linked, as described above. Such copolymers are excellent as to film-forming ability and are not fractured in the course of the subsequent treatments. For the purpose of impregnating the latex in a reinforcing material and forming a membrane, such a copolymer latex has a solids content of more than 30% and a viscosity of 10–500 cp./25° C.

As the reinforcing material used in the present invention, cloths made of organic or inorganic fiber such as glass fiber, polypropylene fiber, and the like are suitable which are not attacked in the subsequent treatment and use. For impregnating the said copolymer latex in the reinforcing material, any suitable known method can be employed. For example, the reinforcing material may be dipped in the latex and then withdrawn, or, if necessary, a long rolled sheet of the reinforcing material may be progressively dipped in the latex from its one end and withdrawn and thus the continuous formation of the membrane can be effected. Subsequently, the latex impregnated into the reinforcing material is dried. The membrane can be heated to dryness and if the heat-drying is effected at elevated temperatures lower than 100° C. the drying period can be shortened. The thickness of the thus obtained membrane of the said copolymer, which has been dried completely and supported by the reinforcing material, is usually 0.03–1.00 mm., preferably 0.10–0.30 mm.

According to this invention, the dried copolymer membrane thus obtained is then treated with concentrated sulfuric acid in order to introduce sulfonic groups into the aromatic nucleus in the said copolymer and simultaneously to convert the said copolymer, which is not yet substantially cross-linked, to an insoluble infusible three dimensional network structure. It is well known that natural rubber may be converted to an insoluble infusible three dimensional network structure by cyclization with concentrated sulfuric acid. However, styrene-butadiene copolymers have generally been considered to be cyclizable only with difficulty. The present inventors have found that the said copolymer formed as a thin membrane may be readily converted to an insoluble infusible three dimensional network structure as in the case of natural rubber, at a temperature even lower than 50° C., when the said membrane is treated with a large quantity of sulfuric acid. In addition, it has been found that the copolymer is not fractured by this treatment with concentrated sulfuric acid. In the hitherto known processes for production of cation permselective membranes, chlorosulfonic acid could be used as a sulfonating agent like the concentrated sulfuric acid, but in the present invention chlorosulfonic acid can not be used due to the fact that the copolymer used is not yet substantially cross-linked and soluble in an organic solvent and chlorosulfonic acid, and hence only concentrated sulfuric acid is practicable. Furthermore, when sulfuric acid is used, it is necessary to select such a concentration of sulfuric acid that the conversion of the copolymer to an insoluble infusible structure and the sulfonating reaction proceed with appropriately matched rates. The greater the content of monovinyl aromatic hydrocarbon compounds in the copolymer, the more readily the sulfonating reaction proceeds and the more difficult is the conversion of the copolymer to the insoluble infusible network structure, and therefore, in such a case sulfuric acid of comparatively low concentration should be used, and in a reverse case, sulfuric acid of higher concentration should be used. A suitable concentration of sulfuric acid to be used should be selected within the range of 90 to 98% depending on the composition of the copolymer.

The temperature and time for this reaction should also be selected in accordance with conditions such as the composition of the copolymer and the concentration of sulfuric acid used, and a temperature below 60° C. is usually suitable, preferably about 30° C., and the reaction time should be set in accordance with the respective conditions. In the examples described later, suitable reaction times for the various conditions are given. The membranes thus treated with concentrated sulfuric acid are then rinsed. The rinsing with water may be finally carried out after the membranes have been dipped successively in acids of progressively lower concentration, and after being rinsed with water, the membrane may also be dipped in a dilute caustic soda solution, if necessary. These procedures for the treatment with concentrated sulfuric acid and rinsing can be carried out continously by successively dipping a long rolled sheet of the membrane to be treated in the treating solutions from its one end and then withdrawing. Thus, a large membrane, for example, having 1 meter or more in width and several tens of meters in length, can be produced. The thickness of the membranes thus obtained is suitably 0.05–1.50 mm., particularly 0.10–0.50 mm.

The base membrane can be obtained by the procedures described above. The properties of this membrane, of course, vary with the conditions of production, and the transport number of cations through the membrane thus obtained is usually 0.90–0.92 and effective resistance 2–30Ω-cm.$^2$. Accordingly, the membrane as such can be used as a cation permselective membrane, but according to the present invention the said membrane is subjected to the following treatments.

The effective resistance used in this specification means the resistance per 1 cm.$^2$ of the membrane, measured in a 0.5 N sodium chloride solution at 25° C.

For the purpose of measuring the selective permeability of the membranes, comparison of the permeability to various kinds of ions can be made and in the present invention, for convenience's sake, comparison of the transport number of sodium ions with that of calcium ions (in some cases magnesium ions) was made. The measurements were carried out as follows:

Electrodes made of silver-silver chloride are placed at both ends of an electrolytic cell and three compartments are formed between an anode chamber and a cathode chamber by successively arranging from the anode side a cation permselective membrane, a sample membrane which is the product in the present invention and is to be tested, an anion permselective membrane and another anion permselective membrane adjacent to the cathode. Starting from the cathode chamber, they are called successively, a sample solution chamber, a concentrating chamber and sodium chloride solution chamber. A mixed solution of NaCl and $CaCl_2$ (NaCl 0.5 N and $CaCl_2$ 0.02 N) is fed into the sample solution chamber from one side and discharged from the other side. In the concentrating chamber is 0.5 N NaCl solution which is not circulated. In the other three chambers, that is, the anode chamber, the cathode chamber and the sodium chloride solution chamber, a solution of 0.5 N NaCl flows constantly. After an electric current was passed with a current density of 2 amp/dm.$^2$ at a constant temperature of 25° C. for 1 hour, the solution in the concentrating chamber is discharged and a fresh solution of 0.5 N NaCl is introduced and this solution is not circulated. After passing the current for another 1 hour, the total solution in this chamber is taken out and the increased amount of Na ion and Ca ion is determined by chemical analysis. The amount of electricity passed for 1 hour is measured by a coulometer, and from this amount of electricity and the said increased amount of Ca ions and Na ions the transport number of Na ions and Ca ions ($n_{Na}$ and $n_{Ca}$) is calculated. The selective permeability to Na ions and Ca ions $$S^{Ca}_{Na}$$

can be calculated by the following formula $$S^{Ca}_{Na} = \frac{n_{Ca}/n_{Na}}{t_{Ca}/t_{Na}}$$

wherein $t_{Ca}$ and $t_{Na}$ are respectively the transport numbers of Ca ions and Na ions in the said sample solution, that is, the mixed solution of 0.5 N NaCl and 0.02 N $CaCl_2$, at 25° C. It is not necessary that the cation and anion permselective membranes used in the above measurement be special. The present inventors used the above-mentioned base membrane as the cation permselective membrane and used as the anion permselctive membrane a membrane obtained by treating said copolymer film, supported by reinforcing material with $TiCl_4$, chloromethylether and then trimethyl amine instead of concentrated sulfuric acid.

$$S^{Ca}_{Na}$$

of the said base membrane of the present invention which was measured by the above-mentioned procedure was 0.8–1.2.

Furthermore, $$S^{Ca}_{Na}$$

of two different commercially available products was 0.38 and 0.80.

According to the present invention, it was possible to improve the $$S^{Ca}_{Na}$$

of the said base membrane by 0.1 to 0.7 by the following treatment. Specifically, a precondensation product which is produced by co-condensing in alkaline medium (1) at least one of the compounds represented by the general formula

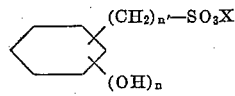

(wherein X is any one of H, $NH_4$, Na and K, $n$ is any one of 1 and 2 and $n'$ is any one of 0 and 1) and (2) at least one of phenol and a mixture of phenol and a compound selected from halogenophenol, nitrophenol, cresol, resorcinol and catechol containing less than one-half of phenol in molar ratio, and (3) formaldehyde, the molar ratio of the said three components being 1:3.5–10:4–35, is coated on the surface of the said base membrane and then a thin film of the said condensation product is formed by heating and curing.

As the compounds represented by the above general formula can be specified a phenol sulfonic acid, resorcinol-sulfonic acid, oxybenzyl sulfonic acid and the like, the typical salt of which compounds is the sodium salt.

In the present invention these compounds can be used only when co-condensed in alkaline medium, for when co-condensed in acidic medium it is impossible to produce membranes which have good permeability to alkali metal ions and ammonium ions and poor permeability to polyvalent cations as mentioned above. This is also true in the case in which the ratio of the components in the said condensation product is decreased or increased out of the said limits in molar ratio and the proportion of the compound, which is represented by the general formula and has sulfonic groups in its structure, becomes too large. On the contrary, if it becomes smaller than the said limit the membrane comes to have too high electrical resistivity for practical use. When the proportion of phenol or formaldehyde is decreased or increased out of the said limits, the purpose of the present invention can not be attained. Thus, it is required that the ratio of each component in the said co-condensation product lie within the said limits and more particularly, it has been found to be especially favorable that the molar ratio of the compound represented by the said general formula or the salt thereof, phenol or a mixture of phenol and a smaller quantity (by molar ratio) of halogenophenol and the like, and formaldehyde is 1:4.5–6.6:9–20. It should be noticed in the present invention that formaldehyde includes any compound that can generate formaldehyde such as paraformaldehyde. As the catalysts used in the co-condensation reaction carried out in alkaline medium, caustic soda, caustic potash, sodium carbonate, potassium carbonate and the like are suitable.

As set forth above, it is permissible that the phenol be replaced in a quantity less than one-half (in molar ratio) of the phenol with at least one of halogenophenol, nitrophenol, cresol, resorcinol or catechol. However, the more the quantity of the replaced compound increases, the more selective permeability to cations decreases, and therefore, its quantity should be decided within the range allowable for use of the product.

There are no special limitations on the method for the production of the said precondensation product. Any method in which these compounds react with each other upon heating may be adopted. There is likewise no special limitation as to heating temperature, but it is desirable in order to shorten the reaction time that the temperature be within the range from about 50° C. to about 100° C. The reaction time varies with the quantity of catalyst and reaction temperature, and should be determined in accordance with the respective conditions. In addition, there is no special limitation on the quantity of the catalyst, but about 0.05–0.5 mol is usually used for 1 mol of phenol.

Since this precondensation product is applied to the surface of the base membrane as described above, it is desirable to use a precondensation product having a viscosity most suitable for this procedure. In some cases, the precondensation product may be diluted with a suitable solvent in order to have suitable viscosity. This precondensation product may be coated only on one side of the base membrane, but the membrane is apt to warp when there is any difference between the degree of swelling of the base membrane and that of the film formed on its surface and accordingly, in order to prevent this tendency it is necessary to form the film on both sides of the base membrane.

After the said components to be condensed or their precondensation product are coated on the surface of the base membrane, the thus obtained membrane is heated in order that this thin film may be cured or hardened. In order that the film thus formed by heating to cure may become as uniform as possible, it is desirable to carry out the said coating uniformly and it is also desirable to regulate the thickness of the film formed. For this purpose any hitherto known method may be employed. The temperature at which the film is heated for curing should be within the range from 110° C. to 250° C., preferably from 140° C. to 200° C. There is no special limitation as to the heating method, for example, the said membrane may be hung in air or in a vessel which is filled with an inert gas such as nitrogen and which is kept at a constant temperature, for the determined time during which the curing reaction is carried out, or the formed film may be first irradiated with an infra-red lamp, and after water and solvent contained in the coated resin have been evaporated, a number of membranes may be piled up and heated in the said vessel kept at a constant temperature.

The film of the said precondensation product to be formed on the surface of the base membrane must not be too thick, otherwise the electrical resistance of the membrane becomes too high. The purpose of the present invention can be attained even when the film is very thin, and therefore, this film should be formed as thin as possible. However, it is difficult to measure directly the thickness of the film with precision, and accordingly, in the present invention the thickness is calculated from the weight increase brought about by coating. In this invention, the thickness of the film, which is defined as a value obtained in the above-mentioned way, may be less than $100\mu$, preferably less than $50\mu$, and as thin as possible. The result of experiments shows that the thickness can be reduced to a few microns, and even with such a thin film the purpose of this invention can be satisfactorily attained.

As described above, in this invention it is necessary to heat the membrane to an elevated temperature in the course of curing and if the base membrane is fractured or cracked by heating, the product becomes worthless. Therefore, it is most important to have base membranes which are not liable to be fractured by heating. The present inventors have made numerous experiments on various hitherto known cation permselective membranes and have found that most of the them are not suitable for the purpose of this invention. Only the base membranes as hereinabove set forth in this specification were suitable for the present invention.

The invention is further described in the following examples which serve to illustrate methods for the production of cation permselective membranes of the present invention.

Example 1

A styrene-butadiene copolymer latex containing 29% of bound styrene and 60% of the total as solids was diluted with distilled water to a concentration at which the total solids content was 57%. In this latex was dipped a plain fabric of glass-fiber of 0.07 mm. thickness, and dried. Thus, a membrane of copolymer was obtained in which the weight ratio of the copolymer to the glass fiber in the membrane was 1:1. The membrane thus obtained was first dipped in 96% sulfuric acid at 30° C. for 3 hours, after which sulfuric acid contained in the membrane was successively diluted by dipping the membrane in 80%, 60% and 20% sulfuric acid for 15 minutes each. Thereafter, the membrane was rinsed with water, and after the resin was converted to Na-type by dipping the membrane in a solution of ½ N NaOH, the membrane was rinsed again with water and stored in ½ N NaCl solution. The membrane thus obtained had excellent properties as a cation permselective membrane, and its effective resistance was $6.2\Omega\text{-cm.}^2$, thickness 0.2 mm., and $$S_{Na}^{Ca} \ 0.91$$

Separately, 24 parts by weight of the dihydrate of the sodium salt of p-phenol sulfonic acid was dissolved in 210 parts of 35% formalin, and the solution was mixed with 94 parts of phenol and 48 parts of 20% caustic soda solution and heated on a water bath with stirring for 50 minutes. The viscous liquid thus obtained was coated thinly on the surface of the aforesaid air-dried membrane with a brush and cured by heating at 130° C. for 2 hours. The thickness of the film calculated from the increase of weight was $8\mu$ and effective resistance of the product was $15.4\Omega\text{-cm.}^2$ and $$S_{Na}^{Ca} \ 0.17$$

Example 2

28 parts of sodium salt of m-phenol sulfonic acid was dissolved in 170 parts of 35% formalin, and the solution was mixed with 94 parts of phenol and 52 parts of 20% caustic soda solution and heated at 85° C. for 2 hours. The viscous liquid thus obtained was diluted with 150 parts of methanol. In this solution was dipped the air-dried base membrane as described in Example 1 for 2 minutes and then withdrawn. After excess resin solution was wiped off, the membrane was dried at 100° C. for 3 minutes and then cured by heating at 160° C. for 1.5 hours. The thickness of the film calculated from the increase of weight was $22\mu$, and effective resistance of the product was $15.5\Omega\text{-cm.}^2$ and $$S_{Na}^{Ca} \text{ was } 1.5$$

Example 3

47 parts of potassium salt of m-phenol sulfonic acid was dissolved in 240 parts of 35% formalin, and the solution was mixed with 94 parts of phenol and 12 parts of 50% caustic potash solution. The mixed solution thus obtained was heated at 85° C. for 3.5 hours and then diluted with 232 parts of dioxane. The liquid was sprayed on an air-dried base membrane. This membrane was then dried at 100° C. for 3 minutes and cured by heating at 160° C. for 2 hours. The thickness of the film calculated from the increase of weight was $18\mu$, and effective resistance of the product was $19.5\Omega\text{-cm.}^2$ and $$S_{Na}^{Ca} \text{ was } 0.13$$

Example 4

38 parts of sodium salt of resorcinol-sulfonic acid was dissolved in 214 parts of 35% formalin, and the resultant solution was mixed with 94 parts of phenol and 50 parts of 20% caustic soda solution. After the mixed solution thus obtained was reacted by heating at 70° C. for 7 hours, film was formed with the resin on the surface of a base membrane in the same manner as in Example 3. The thickness of this film was $15\mu$, and effective resistance was $12.7\Omega\text{-cm.}^2$.

With the membranes in this example and the following examples the selective permeability as to potassium ions and magnesium ions was measured. The method for this measurement was the same as that for the measurement of selective permeability as to sodium ions and calcium ions, as described above except that the 0.5 N NaCl solution and NaCl–CaCl$_2$ solution (0.5 N NaCl, 0.02 N CaCl$_2$) used in the latter method were respectively replaced with 0.5 N KCl solution and mixed KCl–MgCl$_2$ solution (0.5 N KCl, 0.1 N MgCl$_2$), and the selective permeability $$S_K^{Mg}$$

as to K ions and Mg ions was determined in the same manner as described previously.

$S_K^{Mg}$ of the product and of the base membrane in this example were 0.48 and 2.19.

Example 5

100 parts of 35% aqueous solution of sodium p-oxybenzyl sulfonate were mixed with 150 parts of 35% formalin, 24 parts of paraformaldehyde, 94 parts of phenol and 50 parts of 20% caustic soda solution. The mixture was reacted over a water bath for 50 minutes, and the viscous liquid thus obtained was used for forming a film on a base membrane in the same manner as in Example 2. The thickness of the film calculated from the increase of weight was 12μ, effective resistance of the product 12.4Ω-cm.$^2$, and $S_K^{Mg}$ 0.57

Example 6

A product was obtained by treating a base membrane with a viscous liquid which was prepared by dissolving 35 parts of sodium salt of m-phenolsulfonic acid in 214 parts of 35% formalin, admixed with 66 parts of phenol, 42 parts of m-nitrophenol and 50 parts of 20% caustic soda solution, and then heated at 85° C. for 2 hours, in the same manner as in Example 2. The thickness of the film calculated from the increase of weight was 15μ, effective resistance or the product 18.3Ω-cm.$^2$ and $S_{Na}^{Ca}$ 0.21

The thickness of the film obtained by using 21 parts of p-cresol instead of m-nitrophenol was 12μ, effective resistance of the product 15.4Ω-cm.$^2$ and $S_{Na}^{Ca}$ 0.24 and when halogenophenol, resorcinol or catechol was used instead of nitrophenol, a product of substantially the same quality was obtained.

In the above examples, only the latex of Example 1 was used for making the base membrane, but substantially the same results were obtained when other styrene-butadiene copolymer latices and copolymer latices consisting of other monovinyl aromatic hydrocarbon compounds and other conjugated aliphatic polyene compounds, were used as the base membrane.

What is claimed is:

1. A process for the production of cation permselective membranes having specially low permeability to polyvalent cations, comprising impregnating a reinforcing material with a copolymer latex of monovinyl aromatic hydrocarbon and conjugated aliphatic polyene compound, the said monovinyl aromatic hydrocarbon being 20 to 75% of the copolymer, drying the impregnated material to form a membrane of the said copolymer, contacting the thus-obtained membrane with concentrated sulfuric acid in order to sulfonate and simultaneously to convert the copolymer into an insoluble, infusible structure of a synthetic solid polymeric matrix and dissociable sulfonic group bonded chemically to the matrix, coating the surface of the thus-obtained base membrane with a viscous liquid of low molecular condensation product which is produced by copolycondensing in alkaline aqueous solution (1) at least one of the compounds represented by the following general formula,

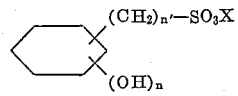

wherein X is a member of the group consisting of H, NH$_4$, Na and K, $n$ is 1—2, and $n'$ is 0—1) and (2) at least one compound selected from the class consisting of phenol, halogenophenol, nitrophenol, cresol, resorcinol, catechol and mixtures thereof, and (3) formaldehyde, the molar ratio of the said three components being 1:3.5–10:4–35 in their respective order, and curing the said coating to form a film tightly adhering to the said base membrane.

2. A process as claimed in claim 1, in which the member of group (2) of the copolycondensate is phenol.

3. A process as claimed in claim 1, in which the concentration of the latex is more than 30% by weight.

4. A cation permselective membrane produced by the process of claim 1.

5. A process for the production of cation permselective membranes having good permeability to alkali metal ions and ammonium ion and having comparatively poor permeability to polyvalent cations, comprising impregnating a reinforcing material with copolymer latex of styrene and butadiene, said styrene being 20 to 75% of the copolymer, drying to form a membrane of the said copolymer latex, contacting the said membrane with concentrated sulfuric acid in order to sulfonate and simultaneously to convert the copolymer into an insoluble, infusible structure of a synthetic organic solid polymeric matrix and dissociable sulfonic group bonded chemically thereto, coating the surface of the thus-obtained selectively cation-permeable base membrane with a viscous low molecular condensation product which is produced by copolycondensing in alkaline aqueous solution (1) a member of the class consisting of phenolsulfonic acid and its salts, (2) phenol and (3) formaldehyde, the molar ratio of the said three components being 1:3.5–10:4–35, and curing the said coating to form a film stuck fast to the said base membrane.

References Cited by the Examiner

UNITED STATES PATENTS 2,636,851  4/1953  Juda et al. _____ 204—296

FOREIGN PATENTS 804,176  11/1958  Great Britain.

JOHN H. MACK, *Primary Examiner.*

D. R. JORDAN, *Assistant Examiner.*